(12) United States Patent
Taylor

(10) Patent No.: US 12,328,569 B2
(45) Date of Patent: Jun. 10, 2025

(54) TRANSFORMING COMPUTER GAME AUDIO USING IMPULSE RESPONSE OF A VIRTUAL 3D SPACE GENERATED BY NeRF INPUT TO A CONVOLUTIONAL REVERBERATION ENGINE

(71) Applicant: Sony Interactive Entertainment Inc., Tokyo (JP)

(72) Inventor: Michael Taylor, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 129 days.

(21) Appl. No.: 18/151,430

(22) Filed: Jan. 7, 2023

(65) Prior Publication Data

US 2024/0236608 A1    Jul. 11, 2024

(51) Int. Cl.
*H04S 7/00* (2006.01)
*G06T 15/20* (2011.01)

(52) U.S. Cl.
CPC ............ *H04S 7/305* (2013.01); *G06T 15/205* (2013.01)

(58) Field of Classification Search
CPC ........... H04S 7/301; H04S 7/306; H04S 7/303
USPC .............................................. 381/61, 63, 17
See application file for complete search history.

(56) References Cited

U.S. PATENT DOCUMENTS

| | | | |
|---|---|---|---|
| 2022/0101623 A1* | 3/2022 | Walsh | G06F 30/27 |
| 2022/0139036 A1 | 5/2022 | Bertel et al. | |
| 2022/0303715 A1 | 9/2022 | Watanabe et al. | |
| 2023/0386202 A1* | 11/2023 | Suresh | G06T 7/60 |

OTHER PUBLICATIONS

"International Search Report and Written Opinion", dated Mar. 21, 2024, from the counterpart PCT application PCT/US23/82498.

* cited by examiner

*Primary Examiner* — Disler Paul
(74) *Attorney, Agent, or Firm* — Kilpatrick Townsend & Stockton LLP

(57) ABSTRACT

A 3D neural radiance field (NeRF) is used to generate an impulse response (IR) characterization, which can then be input to a convolutional reverberation engine to create an audio experience that reflects the in-game world on a 2.0 stereo speaker system. The NeRF recreates a background geometry and the impulse response of a virtual 3D space generated using NeRF is input to the convolutional reverberation engine to transform game sounds/music to appear as though they are occurring inside the 3D space of the game. The same may be done for the player's real-world space in which the virtual IR and real IR are blended together in real-time, and the real-life player tracked as he moves around the room to create audio as it would sound were the player moving through the virtual space while adjusting for the acoustics of the real space.

20 Claims, 9 Drawing Sheets

TRANSFORMING COMPUTER GAME AUDIO USING IMPULSE RESPONSE OF A VIRTUAL 3D SPACE GENERATED BY NeRF INPUT TO A CONVOLUTIONAL REVERBERATION ENGINE

FIELD

The present application relates generally to the transforming of computer game audio using an impulse response of a virtual 3D space generated by NeRF input into to a convolutional reverberation engine.

BACKGROUND

As understood herein, neural radiance fields (NeRF) can be used to model a 3D space, whether virtual r physical, using one or more photographs.

SUMMARY

As further understood herein, NeRF modeling may be leveraged to determine an acoustic impulse response (IR) of a real or virtual space and apply the IR using a convolutional reverberation engine, which is used to process computer simulation audio such as computer game audio to render more realistic sound.

A 3D neural radiance field (NeRF) is used to generate an impulse response (IR) characterization, which can then be input to a convolutional reverberation engine to create an audio experience that reflects the in-game world on a 2.0 stereo speaker system. The NeRF recreates a background geometry and the impulse response of a virtual 3D space generated using NeRF is input to the convolutional reverberation engine to transform game sounds/music to appear as though they are occurring inside the 3D space of the game. The same may be done for the player's real-world space in which the virtual IR and real IR are blended together in real-time, and the real-life player tracked as he moves around the room to create audio as it would sound were the player moving through the virtual space while adjusting for the acoustics of the real space.

Accordingly, a device includes at least one computer storage that is not a transitory signal and that in turn includes instructions executable by at least one processor to generate a three dimensional (3D) neural radiance field (NeRF) from at least one image of a virtual space in a computer simulation. The instructions are executable to use at least part of the NeRF to generate an impulse response (IR) characterizing sound transmission in the virtual space. Further, the instructions are executable to process audio from the computer simulation using the IR and then to play the audio after processing using the IR on at least one speaker.

In some examples the instructions may be executable to process audio from the computer simulation at least in part using at least one convolutional reverberation engine programmed with the IR characterizing sound transmission in the virtual space.

In a non-limiting example, the instructions can be executable to, for at least one object in the virtual space, correlate at least one surface characteristic to at least one acoustic reflection property, and use the at least one acoustic reflection property to generate the IR. The surface characteristic may include at least one texture.

In some examples the speaker is a speaker in a stereo speaker system. Example instructions can be executable to access at least one image of a physical space in which the speaker is disposed, and based at least in part on the image of the physical space, generate a physical space IR. The instructions may be executable to use the physical space IR process sound from the computer simulation such that audio from the computer simulation is played as it would sound were a player moving through the virtual space. In a specific example the instructions are executable to, based at least in part on the image of the physical space, generate a physical space IR at least in part using a NeRF representing the physical space.

In another aspect, an apparatus includes at least one processor programmed with instructions to generate a neural radiance field (NeRF) representation of a virtual space from a computer simulation. The instructions are executable to, using at least one virtual sound source and at least one virtual microphone in the virtual space, generate at least one impulse response (IR) representation of the virtual space. The instructions are executable to process audio from the computer simulation at least in part using the IR representation of the virtual space and to play the audio from the computer simulation on at least one real world (RW) speaker in a RW space.

In another aspect, a method includes generating a neural radiance field (NeRF) representation of a virtual space, and based at least in part on the NeRF representation, generating information representing acoustic transmission in the virtual space. The method includes playing, on at least one speaker, audio processed using the information representing acoustic transmission in the virtual space.

The details of the present application, both as to its structure and operation, can be best understood in reference to the accompanying drawings, in which like reference numerals refer to like parts, and in which:

DETAILED DESCRIPTION

Figure 1:
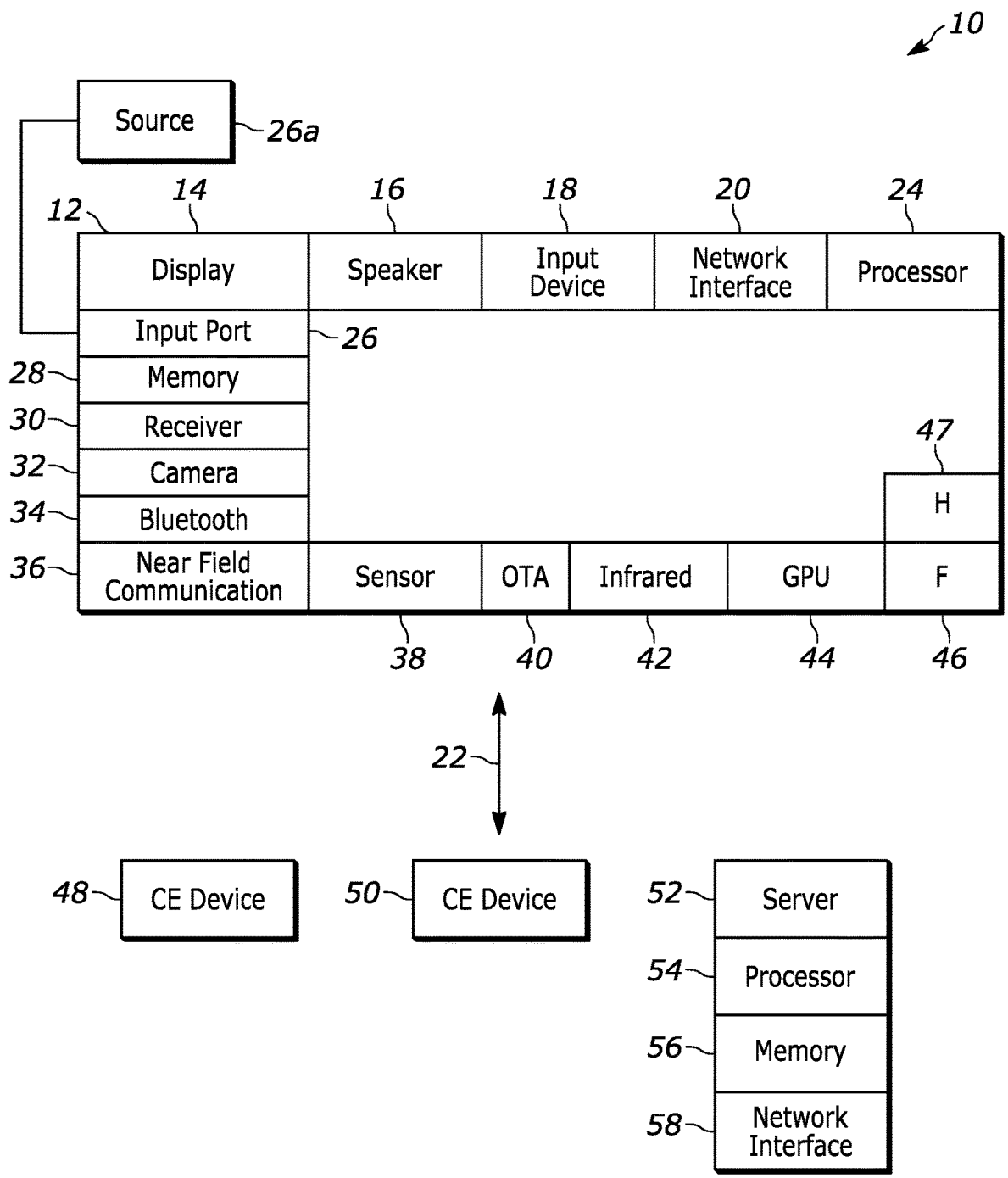
FIG. 1 is a block diagram of an example system in accordance with present principles.

This disclosure relates generally to computer ecosystems including aspects of consumer electronics (CE) device networks such as but not limited to computer simulation networks such as computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
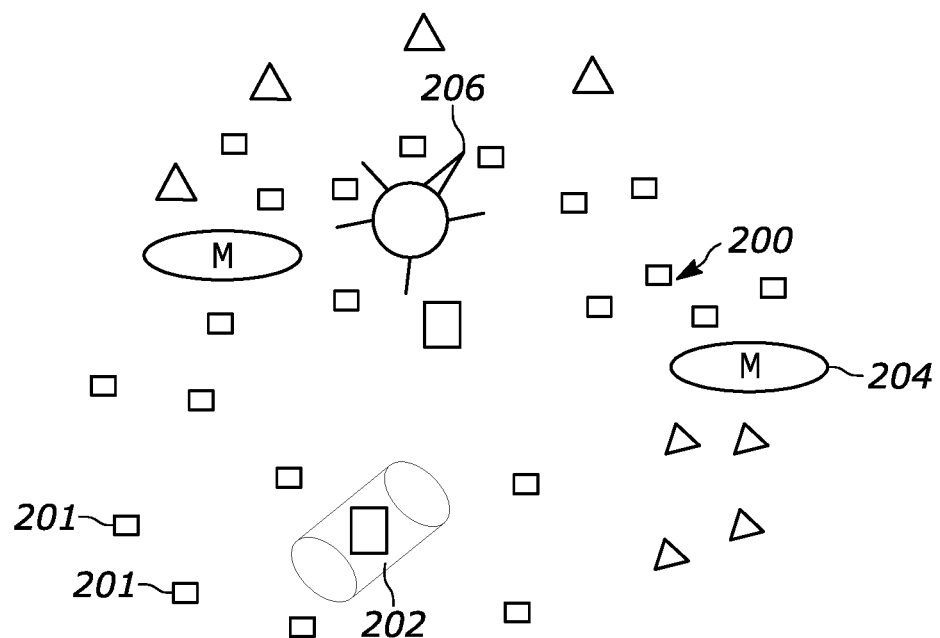
FIG. 2 illustrates a virtual space from a computer simulation such as a computer game showing virtual cameras positioned on a sphere around the virtual space along with virtual microphones and sound sources.
Figure 3:
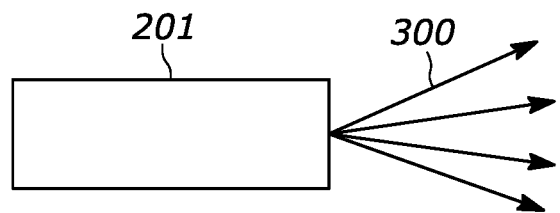
FIG. 3 illustrates one of the virtual cameras in FIG. 2, illustrating ray casting in multiple bearings from a stationary camera.

FIG. 2 conceptually illustrates a 3D neural radiance field (NeRF) 200, which may be thought of as a 3D volume stored in a machine learning (ML) model. An example NeRF to this end can be a NeRF encoded in a multi-resolution hash table the role of which is to store the location of a sparse multiresolution 3D grid to speed up the training and rendering of NeRF. Perhaps over-simplified, NeRF involves generating rays from various viewpoints (for detection by virtual cameras 201 that may be located at the viewpoints, shown positioned on a sphere) in a modeled space and determining when and where the rays intersect and bounce off simulated objects 202 to subsequently predict what rays will hit. As shown in FIG. 3, each virtual camera 201 may be translationally stationary on the sphere and may emit virtual rays 300 at multiple trajectories. The rays are simulated as being sent through the scene to sample 3D points and then the points from and their corresponding 2D viewing directions used as input to a multilayered perceptron (MLP) to produce an output set of colors/textures and densities representing the 3D space, objects 202 therein, and if desired simulated surfaces such as walls.

Thus, NeRF outputs, for modeled objects, both a surface and a color/texture of that surface. Computer graphic textures may contain data used for physically based rendering (PBR) materials and may be compressed using block compression (BCn), wherein n is an integer.

Texture data may include normal (defining small shape detail for the surface, specifically representing the surface normal of the underlying surface), roughness (sometimes referred to as gloss data) that describes essentially the variance of normals across a texture pixel, "albedo" which characterizes the diffuse lighting response of a material, and reflectance, representing specular lighting response. NeRF recreates surroundings of the virtual space as well. Essentially, a depth map is generated using NeRF.

FIG. 2 shows that after the 3D space is modeled by a NeRF, or simultaneously with the NeRF modeling, one or more simulated microphones 204 at known locations in the space may detect simulated sound from one or more simulated sources 206. The simulated sound properties and locations of the sources 204 and microphones 206 are known, so that simulated sound is modeled using geometry to bounce off the various objects 202 according to their shapes and surface textures generated by the NeRF for detection by the simulated microphones 206.

Figure 4:
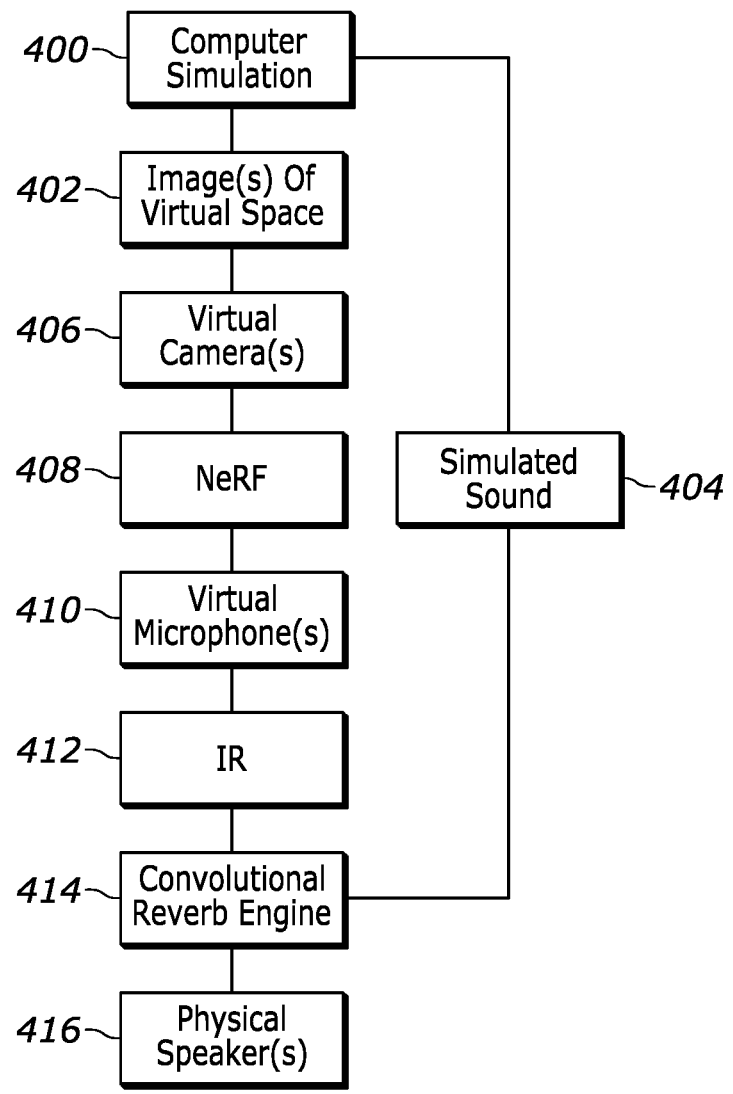
FIG. 4 illustrates a block diagram of an example architecture.

FIG. 4 illustrates further. A computer simulation 400 outputs one or more 2D or 3D images 402 of virtual space as well as simulated audio 404. One or more virtual cameras 406 are positioned to detect virtual rays emitted into the space by a NeRF engine 408. Virtual microphones 410 detect virtual sound emitted into the NeRF representation of space to output signals that effectively constitute an impulse response (IR) 412 of the virtual space. The IR may be thought of as a snapshot of an acoustic model, and an IR shapes input sound such that the resulting sound is as if the input sound was emitted in space The IR 412 of the virtual space is input to a filter such as a convolutional reverberation (CR) engine 414. During subsequent presentation of the simulation audio 404, the audio is processed through the filter as by convoluting the audio with the IR 412 of the virtual space and then played on one or more speakers 416 in the real world. The speakers 416 may be stereo speakers or other types of speakers such as on a head-mounted display (HMD).

Figure 5:
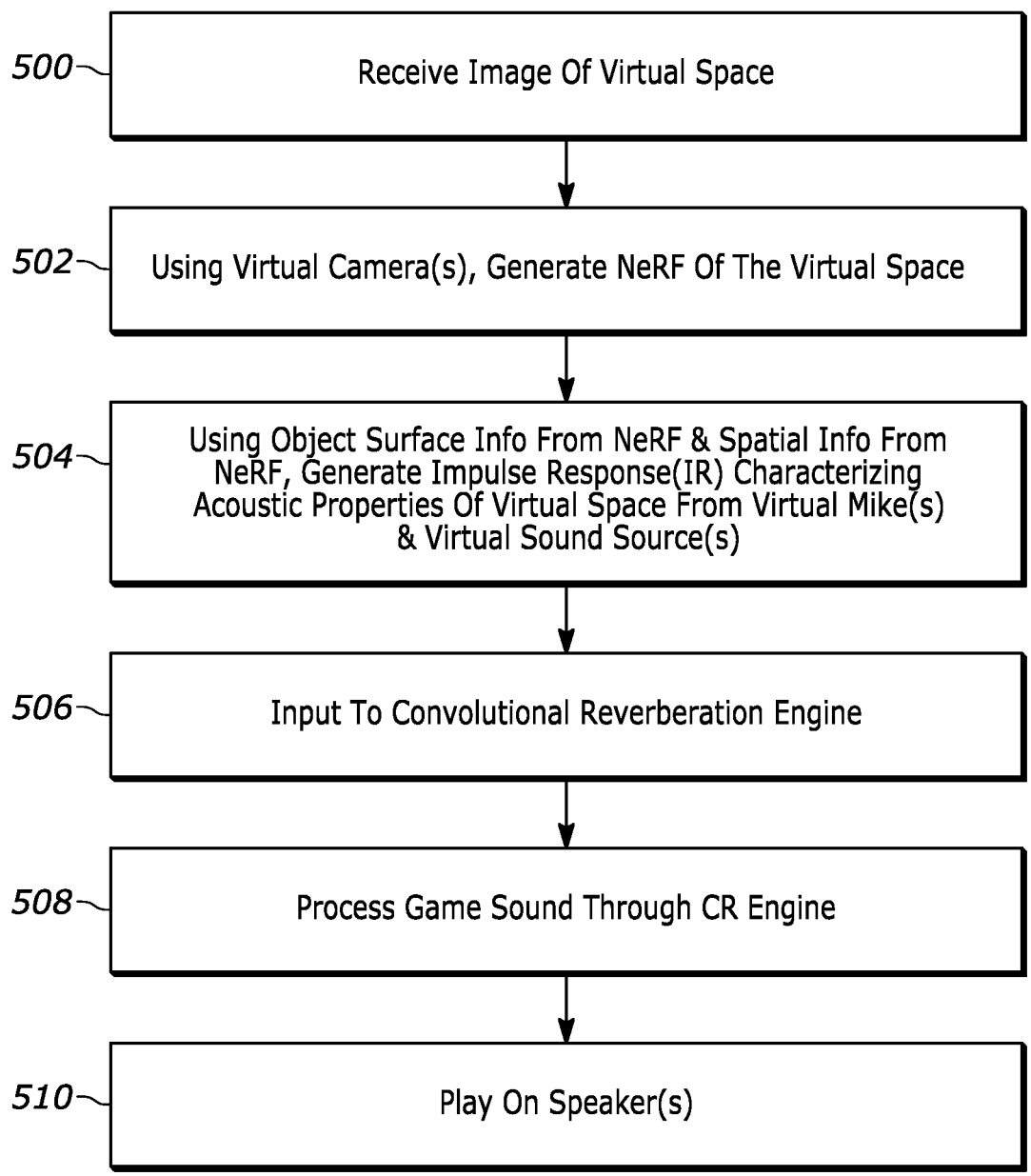
FIG. 5 illustrates example logic in example flow chart format consistent with FIG. 4.

FIG. 5 illustrates example logic consistent with disclosure herein that may be stored on any computer memory disclosed herein and executed by any one or more processors.

Commencing at block 500, at least one image is received from a computer simulation such as a computer game of a virtual space. Proceeding to block 502, using virtual cameras and ray sources according to NeRF principles, a NeRF representation of the virtual space including objects therein and the textures/colors of the objects is generated.

Moving to block 504, using the NeRF information, a simulated sound source can be emulated to emit virtual sound in the NeRF representation from one or more know locations, which is modeled to propagate in the virtual space according to reflections, absorption, etc. by objects in the space consistent with the texture/color information from the NeRF. The virtual sound is simulated to undergo reverberation, reflection, absorption, etc. as the case may be depending on the NeRF parameters for objects and space boundaries and then to be picked up by one or more virtual microphones positioned at known simulated locations in the NeRF space.

The output of the virtual microphone(s) essentially represents an impulse response of the virtual space. The IR is input to a filter at block 506. The filter may be implemented by a CR engine such as the CR engine 414 in FIG. 4. Audio generated by the computer simulation that sourced the image at block 400 is processed through the filter at block 508 and played on one or more speakers in the physical world at block 510.

Figure 6:
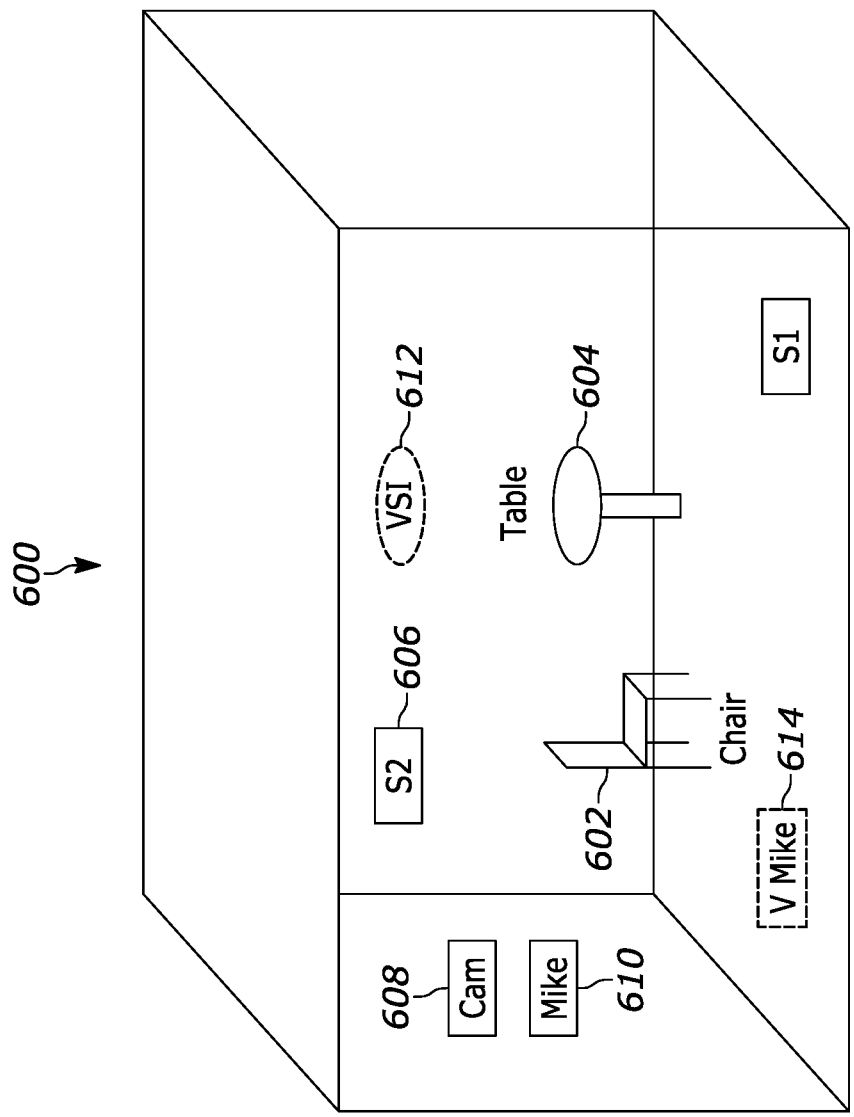
FIG. 6 illustrates a physical (real world) space containing speakers on which audio generated consistent with present principles may be played.

FIG. 6 illustrates additional techniques that may be used to modify not only computer game audio using NeRF but additionally modify it to account for the IR of a real world (RW) physical space in which a player plays the game with game audio being presented on one or more speakers such as 2.0 stereo speakers in the RW space. The acoustic IR for a physical space 600 containing RW objects such as a chair 602, table 604, and audio speakers 606 is determined by emitting sounds from one or more RW sound sources (such as one of the speakers) and detecting the sound using one or more RW microphones 610.

The RW IR can be input to the filter such as the convolutional reverberation engine 414 in FIG. 4 along with the IR of the virtual space.

The RW IR of the physical space 600 may be determined as described using conventional IR determination techniques. Or, the RW IR of the space 600 may be determined using NeRF implemented on one or more images from one or more RW cameras 608. Sound from one or more virtual sources 612 is injected into the NeRF representation of the RW space 600 and picked up by one or more virtual microphones 614 to output an acoustic impulse response representing the RW space 600. By subsequently passing game audio through the RW IR programmed into a convolutional reverberation engine, changes to game audio caused by the RW space 600 and objects therein is effectively undone.

Figure 7:
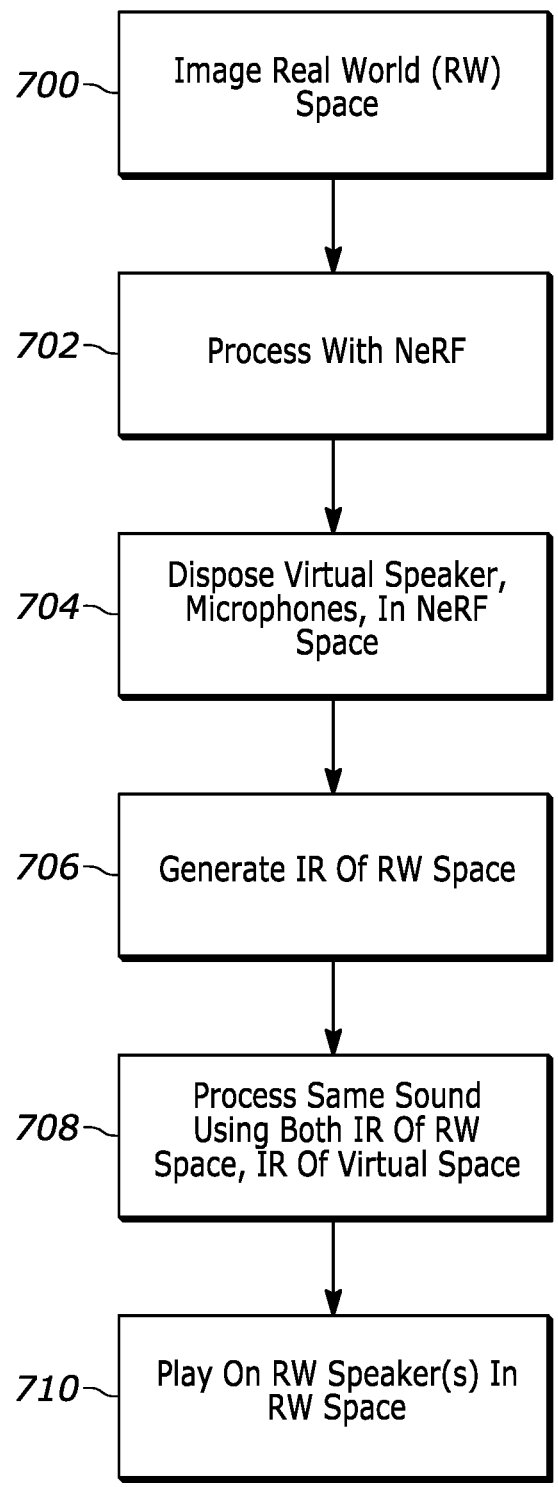
FIG. 7 illustrates example logic in example flow chart format consistent with FIGS. 4-6.

FIG. 7 illustrates the NeRF-based technique for determining an IR for the RW space 600 shown in FIG. 6. Commencing at block 700, one or more images of the RW space are received and processed using NeRF at block 702 to generate a 3D representation in NeRF of the RW space 600. Virtual sound sources and microphones are simulated into the NeRF representation at block 704 and activated to generate, from the virtual microphone output, the acoustic IR of the RW space 600 at block 706.

Proceeding to block 708, the game sound is processed using both the virtual space IR described in relation to FIGS. 4 and 5 and the RW acoustic IR described in relation to FIGS. 6 and 7 and then played on the speakers 606 of the RW space 600 at block 710.

Figure 8:
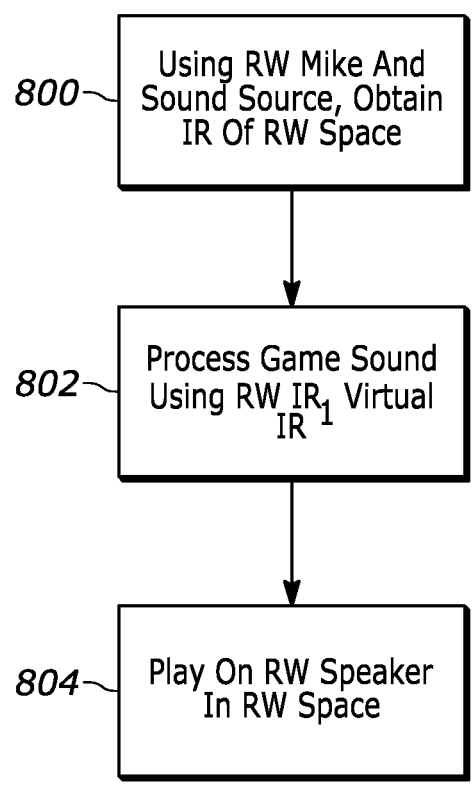
FIG. 8 illustrates alternate example logic in example flow chart format for generating an impulse response (IR) for a real world (RW) space.

FIG. 8 illustrates that alternative to using a NeRF to generate the acoustic IR of a real-world space, at block 800 real world microphones and sound sources can be used to obtain the IR of the RW space. The game audio is processed at block 802 using the IR from block 800 and the virtual IR from FIG. 5 and played on RW speakers at block 804.

Figure 9:
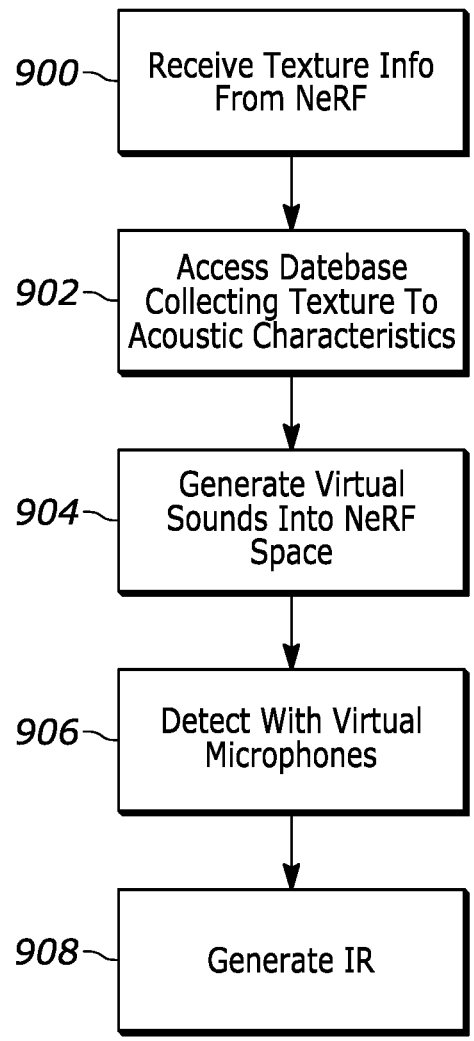
FIG. 9 illustrates example logic in example flow chart format for correlating NeRF information to acoustic characteristics.

FIG. 9 drills down into the details of a first technique for using NeRF-generated textures to acoustic reflection/distortion/reverberation properties. Commencing at block 900, the object shapes and textures are received from the NeRF. At block 902 a data structure is accessed correlating object textures and if desired object shapes to materials such as metal, type of metal, plastic, etc. that in turn may be mapped to acoustic characteristics. Or, the mapping may be direct from the shapes and textures to the final acoustic characteristics of the modeled object. Virtual sound is then emitted at block 904 into the NeRF representation and detected using at least one virtual microphone after it interacts with virtual objects at block 906. The output of the microphone is used at block 908 to establish the IR.

Figure 10:
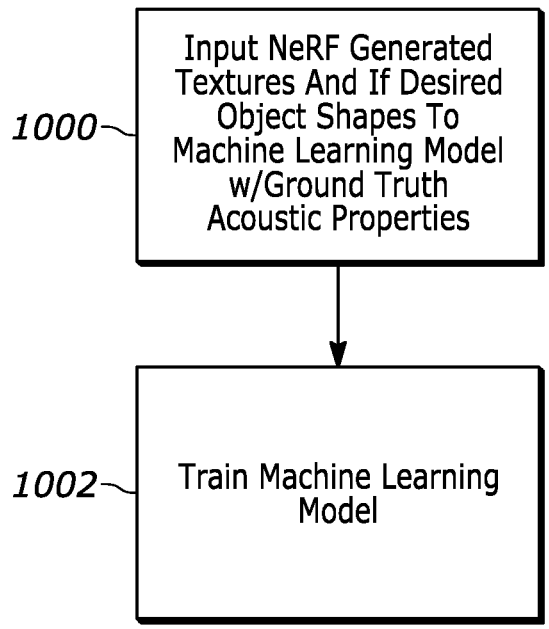
FIGS. 10 and 11 illustrate alternate example logic in example flow chart format for correlating NeRF information to acoustic characteristics, in this case using a machine learning (ML) model.
Figure 11:
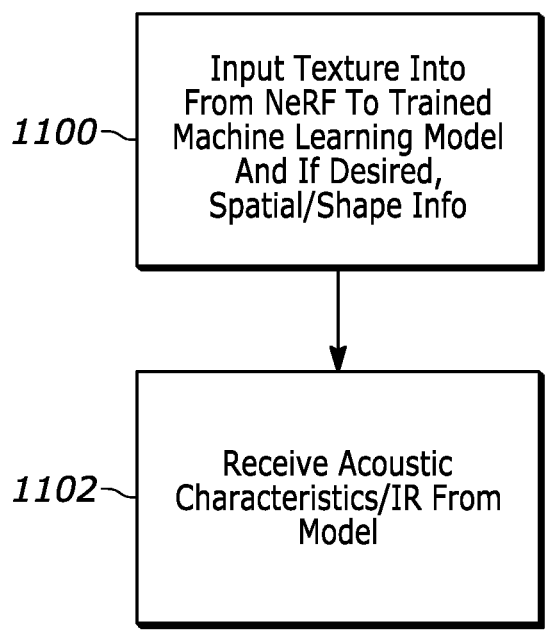

FIGS. 10 and 11 illustrate an alternate machine learning (ML) technique for using NeRF-generated textures to acoustic reflection/distortion/reverberation properties. Commencing at block 1000, a training set of NeRF-generated textures and if desired shapes of virtual objects along with a ground truth label indicating the acoustic properties of the object are input to one or more ML models, which are trained on the training set at block 1002.

Subsequently, at block 1100 in FIG. 11, a texture and if desired spatial and object information from the NeRF 408 shown in FIG. 4 are provided to the ML model(s) trained according to FIG. 10. At block 1102 the ML model returns the acoustic characteristics of the virtual objects in the virtual space for use at block 504 in FIG. 5 or block 706 in FIG. 7 to generate an acoustic impulse response (IR) for input to, e.g., the convolutional reverberation engine 414 in FIG. 4.

While the particular embodiments are herein shown and described in detail, it is to be understood that the subject matter which is encompassed by the present invention is limited only by the claims.

What is claimed is:

1. A device comprising:
   at least one computer storage that is not a transitory signal and that comprises instructions executable by at least one processor to:
   generate a three dimensional (3D) neural radiance field (NeRF) from at least one image of a virtual space in a computer simulation;
   use at least part of the NeRF to generate an impulse response (IR) characterizing sound transmission in the virtual space;
   process audio from the computer simulation using the IR; and
   play the audio after processing using the IR on at least one speaker.

2. The device of claim 1, wherein the instructions are executable to process the audio from the computer simulation at least in part using at least one convolutional reverberation engine decoding the IR characterizing sound transmission in the virtual space.

3. The device of claim 1, comprising the at least one processor.

4. The device of claim 1, wherein the instructions are executable to:
   for at least one object in the virtual space, correlate at least one surface characteristic to at least one acoustic reflection property; and
   use the at least one acoustic reflection property to generate the IR.

5. The device of claim 4, wherein the surface characteristic comprises at least one texture.

6. The device of claim 1, wherein the at least one speaker comprises a speaker in a stereo speaker system.

7. The device of claim 1, wherein the instructions are executable to:
   access at least one image of a physical space in which the speaker is disposed;
   based at least in part on the image of the physical space, generate a physical space IR; and
   use the physical space IR to process sound from the computer simulation such that audio from the computer simulation is played as it would sound were a player moving through the virtual space.

8. The device of claim 7, wherein the instructions are executable to:
   based at least in part on the image of the physical space, generate a physical space IR at least in part using a NeRF representing the physical space.

9. An apparatus comprising:
   at least one processor programmed with instructions to:
   generate a neural radiance field (NeRF) representation of a virtual space from a computer simulation;
   using at least one virtual sound source and at least one virtual microphone in the virtual space, generate at least one impulse response (IR) representation of the virtual space;
   process audio from the computer simulation at least in part using the IR representation of the virtual space; and
   play the audio from the computer simulation on at least one real world (RW) speaker in a RW space.

10. The apparatus of claim 9, wherein the instructions are executable to process audio from the computer simulation at least in part using at least one convolutional reverberation engine programmed with the IR representation of the virtual space.

11. The apparatus of claim 9, wherein the instructions are executable to:
    for at least one object in the virtual space, correlate at least one surface characteristic of the object to at least one acoustic reflection property; and
    use the at least one acoustic reflection property to generate the IR representation of the virtual space.

12. The apparatus of claim 11, wherein the surface characteristic comprises at least one texture.

13. The apparatus of claim 9, wherein the at least one RW speaker comprises a speaker in a stereo speaker system.

14. The apparatus of claim 9, wherein the instructions are executable to:
    access at least one image of a physical space in which the RW speaker is disposed;
    based at least in part on the image of the physical space, generate a physical space IR; and
    use the physical space IR to process sound from the computer simulation such that audio from the computer simulation is played as it would sound were a player moving through the virtual space.

15. The apparatus of claim 14, wherein the instructions are executable to:

based at least in part on the image of the physical space, generate a physical space IR at least in part using a NeRF representing the physical space.

16. A method comprising:
generating a neural radiance field (NeRF) representation of a virtual space;
based at least in part on the NeRF representation, generating information representing acoustic transmission in the virtual space; and
playing, on at least one speaker, audio processed using the information representing acoustic transmission in the virtual space.

17. The method of claim 16, wherein the information representing acoustic transmission in the virtual space comprises at least one impulse response (IR) element.

18. The method of claim 17, comprising processing the audio using at least one convolutional reverberation engine programmed with the IR.

19. The method of claim 16, wherein the virtual space and the audio are both sourced from a computer simulation.

20. The method of claim 16, comprising processing the audio using at least one impulse response (IR) representation of a physical space in which the speaker is located.

* * * * *